United States Patent
Seo et al.

(10) Patent No.: US 10,604,070 B2
(45) Date of Patent: Mar. 31, 2020

(54) METHOD AND APPARATUS FOR INFORMING PEDESTRIAN AND OCCUPANT OF VEHICLE OF EACH OTHER'S APPROACH

(71) Applicant: SAMSUNG ELECTRONICS CO., LTD., Suwon-si (KR)

(72) Inventors: YoungWan Seo, Seoul (KR); Baek Hwan Cho, Seoul (KR); Paul Barom Jeon, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/646,862

(22) Filed: Jul. 11, 2017

(65) Prior Publication Data
US 2018/0126902 A1 May 10, 2018

(30) Foreign Application Priority Data
Nov. 9, 2016 (KR) .................. 10-2016-0148670

(51) Int. Cl.
| | | |
|---|---|---|
| *B60Q 1/00* | (2006.01) | |
| *B60Q 9/00* | (2006.01) | |
| *B60Q 1/52* | (2006.01) | |
| *B60Q 5/00* | (2006.01) | |
| *B60R 1/00* | (2006.01) | |

(52) U.S. Cl.
CPC ............ *B60Q 9/008* (2013.01); *B60Q 1/525* (2013.01); *B60Q 5/006* (2013.01); *B60R 1/00* (2013.01); *B60R 2300/307* (2013.01)

(58) Field of Classification Search
None
See application file for complete search history.

(56) References Cited

U.S. PATENT DOCUMENTS

| | | | |
|---|---|---|---|
| 7,848,566 B2 | 12/2010 | Schneiderman | |
| 8,036,425 B2 | 10/2011 | Hou | |
| 8,639,214 B1* | 1/2014 | Fujisaki | G06Q 20/32 379/88.03 |
| 9,230,419 B2 | 1/2016 | Beggs et al. | |
| 9,881,503 B1* | 1/2018 | Goldman-Shenhar | G08G 1/166 |
| 2014/0111646 A1* | 4/2014 | Hamilton, Sr. | B60R 1/00 348/148 |
| 2015/0035665 A1 | 2/2015 | Plante et al. | |
| 2015/0094118 A1* | 4/2015 | Rodolico | H04M 1/0264 455/566 |
| 2015/0163345 A1* | 6/2015 | Cornaby | G06F 3/04847 345/633 |
| 2017/0269725 A1* | 9/2017 | Kang | G06F 3/0488 |

(Continued)

FOREIGN PATENT DOCUMENTS

| | | |
|---|---|---|
| JP | 2007-334554 A | 12/2007 |
| JP | 4937844 B2 | 5/2012 |
| JP | 5838879 B2 | 11/2013 |

(Continued)

*Primary Examiner* — Julie B Lieu
(74) *Attorney, Agent, or Firm* — Sughrue Mion, PLLC

(57) ABSTRACT

Disclosed is a method and apparatus of detecting an object approaching a vehicle, the method includes a user from the image, extracting feature points associated with the device or a portion of the user's body from the image of the user, detecting the object using a device based on the feature point, and issuing an alert of the approaching object.

26 Claims, 7 Drawing Sheets

(56) References Cited

U.S. PATENT DOCUMENTS

2018/0093610 A1* 4/2018 Sun ................... B60R 11/02
2018/0178720 A1* 6/2018 Ohtani ............... B60K 35/00

FOREIGN PATENT DOCUMENTS

| | | |
|---|---|---|
| JP | 5482323 B2 | 5/2014 |
| JP | 5343789 B2 | 1/2016 |
| KR | 10-2013-0091907 A | 8/2013 |
| KR | 10-1302798 B1 | 9/2013 |
| KR | 10-1344034 B1 | 12/2013 |
| KR | 10-1427032 B1 | 8/2014 |
| KR | 10-2015-0002040 A | 1/2015 |
| KR | 10-1543105 B1 | 8/2015 |

* cited by examiner

METHOD AND APPARATUS FOR INFORMING PEDESTRIAN AND OCCUPANT OF VEHICLE OF EACH OTHER'S APPROACH

CROSS-REFERENCE TO RELATED APPLICATION(S)

This application claims the benefit under 35 USC § 119(a) of Korean Patent Application No. 10-2016-0148670 filed on Nov. 9, 2016, in the Korean Intellectual Property Office, the entire disclosure of which is incorporated herein by reference for all purposes.

BACKGROUND

1. Field

The following description relates to method and apparatus for informing a pedestrian and occupants of a vehicle of each other's approach.

2. Description of Related Art

An advanced driver assistance system (ADAS) assists a driver with driving, and an autonomous driving system allow the driver to travel to a destination without manipulation of the driver. The ADAS and the autonomous driving system detect a pedestrian or a bicycle rider using various sensors. In practice, such detection may not always be accurate.

Pedestrians may not pay attention to their surroundings when listening to music, using a headphone or an earphone, or viewing images on a mobile device. Similarly, bicycle users listening to music using the headphone or the earphone may also not pay attention to their surroundings. In these cases, there is a high risk of accident due to lack of attention.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of informing of an approaching vehicle, the method including detecting an object using a device from an image, and informing the object that the vehicle is approaching.

The detecting of the object may include detecting a user from the image, extracting a feature point associated with the device from the image of the user, determining whether the user is using the device based on the extracted feature point, and detecting the user as the object, in response to determining that the user is using the device.

The extracting of the feature point may include any one or any combination of extracting a static feature point including an exterior feature of the user, and extracting dynamic feature points including any one or any combination of features of consecutive motions of the user and a feature of a distinctive movement in an ambient environment around the user.

The extracting of the static feature point may include extracting the static feature point including the exterior feature of the user using a first classifier trained in advance.

The extracting of the dynamic feature points may include extracting the dynamic feature points using at least one of an optical flow-based object tracking method or a second classifier trained in advance.

The determining of whether the user is using the device may include determining whether the user is using the device based on at least one of the static feature point or the dynamic feature points.

The method may include detecting a position of a portion of a body of the object.

The detecting of the object may include detecting a user from the image, and extracting at least one of a feature point associated with the device or a feature point associated with the portion of the body of the object from the image of the user.

The portion of the body of the object may include at least one of a head, an ear, or a hand of the object.

The informing of the object that the vehicle is approaching may include any one or any combination of informing the object that the vehicle is approaching by providing auditory information using a directional speaker, informing the object that the vehicle is approaching by providing visual information using a headlight of the vehicle, and informing the device of the object that the vehicle is approaching through wireless communication between the device and the vehicle.

The method may include Informing an occupant of the vehicle that the object is approaching, in response to a determination that the object is using the device.

The informing of the occupant of the vehicle that the object is approaching may include informing the passenger in the vehicle that the object is approaching based on any one or any combination of auditory information using an audio apparatus in the vehicle, visual information on a display in the vehicle, tactile information delivered by a steering of the vehicle, and a vibration of a seat.

The detecting of the object may include detecting the object currently using the device from the image using a classifier trained based on images of users using the device.

The device may include at least one of a headset, an earphone, cell phone, smart phone, mobile device, music player, or a portable terminal.

The user may include any one of a pedestrian, a wheelchair rider, or a bicycle rider.

The static feature point may include any one or any combination of points indicating an angle of a head or a neck pointing downward, a gaze of the user pointing downwards, an angle of a hand pointing upward, a shape of a hand manipulating the device, and points on an ear of the user wearing a headphone.

The dynamic feature points may include any one or any combination of the user shaking a body, dancing motions of the user, the user walking at a different pace when compared to other in the ambient environment, and the user moving with a different gesture when compared to the others in the ambient environment.

The static feature point and the dynamic feature points are extracted simultaneously.

The static feature point and the dynamic feature points are extracted separately.

In another general aspect, there is provided an apparatus for informing an occupant of a vehicle of an approaching object, the apparatus including a processor configured to detect an object using a device from an image, and to inform the occupant that the object is approaching.

The processor may be configured to detect a user from the image, to determine whether the user is using the user based on a feature point associated with the device extracted from the image of the user, and to detect the user as the object, in response to determining that the user is using the device.

The processor may be configured to extract a static feature point including an exterior feature of the user using a first classifier trained in advance, and extract dynamic feature points including any one or any combination of features of consecutive motions of the user and a feature of a distinctive movement in an ambient environment around the user using at least one of an optical flow-based object tracking method or a second classifier trained in advance.

The apparatus may include a vision sensor configured to capture the image.

The processor may be configured to detect a user from the image, to detect a position of a body portion of the user, and to extract at least one of a feature point associated with the device or a feature point associated with the body portion of the user from the image.

The processor may be configured to inform the occupant in the vehicle that the object is approaching based on any one or any combination of auditory information using an audio apparatus in the vehicle, visual information on a display in the vehicle, tactile information delivered by a steering of the vehicle, or a vibration of a seat.

The processor may be configured to inform the object that the vehicle is approaching, in response to the determination that the object is using the device.

The apparatus may include a directional speaker configured to face a direction of the object, wherein the processor is further configured to inform the object that the vehicle is approaching by providing auditory information using the directional speaker.

The apparatus may include a communication interface configured to perform wireless communication between the vehicle and the device, wherein the processor is further configured to inform the device used by the object that the vehicle is approaching through the wireless communication.

In another general aspect, there is provided an apparatus for detecting an object approaching a vehicle, the apparatus including a sensor configured to capture an image, a processor configured to detect a user from the image, to extract a feature point associated with the device or a feature point associated with a portion of the user's body from the image of the user, to detect the object using a device based on the feature point, and to issue an alert of the approaching object, and a communicator configured to output the alert.

Other features and aspects will be apparent from the following detailed description, the drawings, and the claims.

BRIEF DESCRIPTION OF THE DRAWINGS

FIG. 1 illustrates an example of a method of informing a pedestrian and occupant of a vehicle of each other's approach of.

Figure 1:
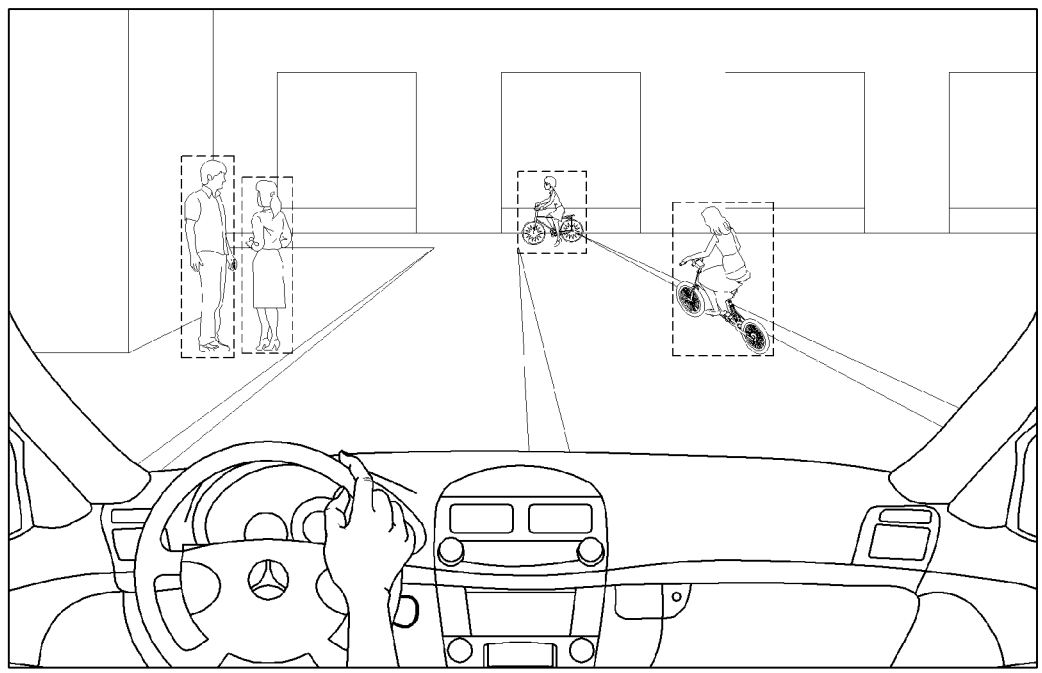

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise.

In an example, the following embodiments automatically detect objects, such as, for example, a pedestrian, a wheelchair rider, and a bicycle rider who is distracted by a sound or image. The pedestrian, wheelchair rider, and a bicycle rider may be distracted by a sound and/or an image when using a headphone, an earphone, and a mobile device to listen to music, or viewing images using a mobile device. In an example, the disclosed apparatus uses a sensor such as, for example, a camera, a radar, a lidar, an ultrasonic sensor included in a vehicle and inform an occupant of the vehicle and the pedestrian and/or the bicycle rider of each other's approach.

The method and apparatus for informing pedestrian and occupant of vehicle of each other's approach may be implemented as or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent automobile, and an autonomous driving vehicle including a camera, a vision sensor, or an ultrasonic sensor.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

FIG. 1 illustrates an example of a method of informing a pedestrian and an occupant of a vehicle of each other's an approach. FIG. 1 illustrates a front view including pedestrians and bicycle riders captured from a vehicle.

The vehicle is, for example, an autonomous driving vehicle, an intelligence automobile, and a vehicle including an advanced driver assistance system (ADAS). The vehicle includes devices and sensors, such as, for example, a radar, a lidar, an ultrasonic sensor, a complementary metal-oxide-semiconductor (CMOS) image sensor (CIS) camera, an infrared camera, a vision sensor, and a capturing device including a vision sensor in a vehicle.

When the pedestrian and the bicycle rider are distracted by a sound or image, a speed of detecting the vehicle may decrease more than usual. In an example, the pedestrian and the bicycle rider may recognize the vehicle by a sound of the vehicle when the vehicle comes close to the pedestrian and the bicycle rider. Thus, the pedestrian and the bicycle rider may not immediately respond to the oncoming vehicle, which may lead to an accident.

Also, the pedestrian and the bicycle rider listening to music using the headphone or the earphone, or viewing the images using the mobile device may take unexpected motions such as sudden changes of direction. Thus, a driver of the vehicle may have difficulty coping with an unexpected impediment.

An apparatus for informing a pedestrian and an occupant of a vehicle of each other's approach automatically detects a pedestrian and/or a bicycle rider who is distracted by a sound/images from an image captured or sensed through devices or sensors mentioned above, and informs a detected object and an occupant of the vehicle of each other's approach. Through this, the apparatus allows the detected object and the occupant of the vehicle to prepare for the approach and to reduce a risk of an accident. Hereinafter, the apparatus for informing a pedestrian and an occupant of the vehicle of each other's approach is also referred to as an informing apparatus, and the user device is one of the digital devices described above. In an example, the digital device is a mobile terminal, a headphone, an earphone, and a headset that is provided in a portable form to perform communication functions and is worn by a user on a part of body. Also, it is understood that the occupant of the vehicle includes both a driver of the vehicle and its passengers.

The informing apparatus informs the pedestrian and/or the bicycle rider that the vehicle is approaching and informs the occupant of the vehicle that the pedestrian and/or the bicycle rider are approaching, thereby preventing an occurrence of an accident.

Figure 2:
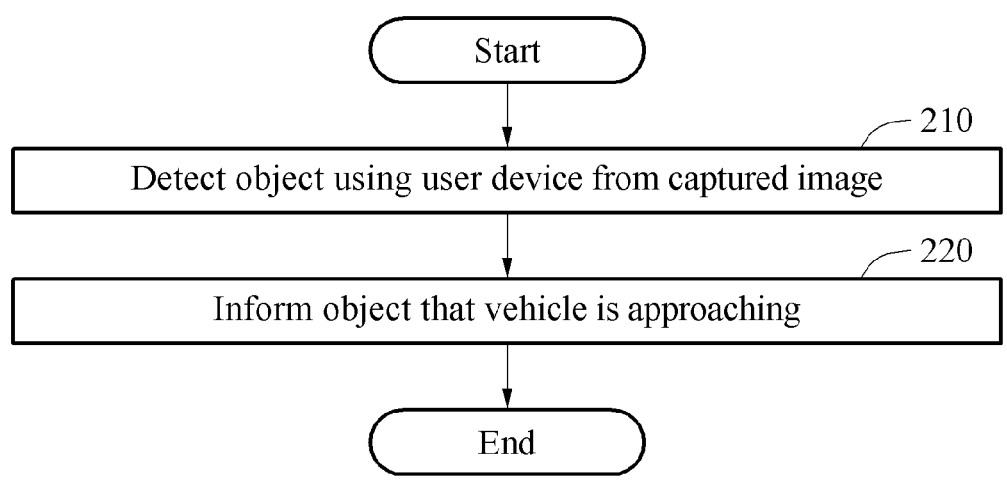
FIG. 2 illustrates an example of a method of informing an object of an approach of a vehicle.

FIG. 2 illustrates a method of informing an object of an approach of a vehicle. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the above descriptions of FIG. 1 are also applicable to FIG. 2, and are incorporated herein by reference. Thus, the above description may not be repeated here.

In 210, an informing apparatus detects an object that is using a user device from a captured image. The informing apparatus detects the object currently using the user device from the captured image using a classifier that is trained based on images of a user who is using the user device.

In an example, the captured image is an image captured by devices such as, for example, a vision sensor included in the informing apparatus, a CIS camera, an infrared camera, and other image capturing devices. In an example, the captured image is received from an external source through a communication interface.

The informing apparatus classifies the object currently using the user device and a user not using the user device from the captured image. Hereinafter, the object is understood to be a user determined or detected among users included in the captured image as a user who is using the user device. For example, the informing apparatus detects the object using a classifier that classifies an image of the object and an image of a user not using the user device and assigns the images to different classes.

The informing apparatus uses a detector configured to extract feature points based on, for example, a histogram of oriented gradient (HOG) and a scale invariant feature transform (SIFT) or a neural network-based detector to extract feature points associated with the user device from the captured image and to detect the object.

The HOG is a vector obtained by dividing a target area into cells of a predetermined size, obtaining a histogram in a direction of edge pixels, for example, pixels having a gradient magnitude greater than or equal to a value, for each of the cells, and connecting histogram bin values in series. The HOG may be an edge-directional histogram template. The HOG may be used as a matching method at a middle stage between a template matching and a histogram matching. Also, the HOG maintains geometric information in a unit of block and uses a histogram in each block, thereby achieving robustness to a local change.

The SIFT is obtained by selecting identifiable feature points such as corner points from an image and extracting a feature vector with respect to a local patch based on each of the feature points. An SIFT feature vector is a 128-dimensional vector obtained by dividing an image patch around the feature vector into 4×4 blocks, obtaining histograms of a size and a gradient direction of pixels included in each of the blocks, and connecting histogram bin values in series. The SIFT is basically a feature that expresses a local gradient distribution characteristic, for example, a brightness changing direction and a degree of a radical change in brightness, around a feature point.

The informing apparatus detects the object currently using the user device from the captured image using various methods, some of which are described above. Various other methods of detecting the object will be described with reference to FIGS. 3 through 5.

In 220, the informing apparatus informs the object detected in operation 210 that the vehicle is approaching. The informing apparatus also informs an occupant of the vehicle that the object is approaching. A method of informing the object and the occupant of each other's approach will be described with reference to FIG. 6.

Figure 3:
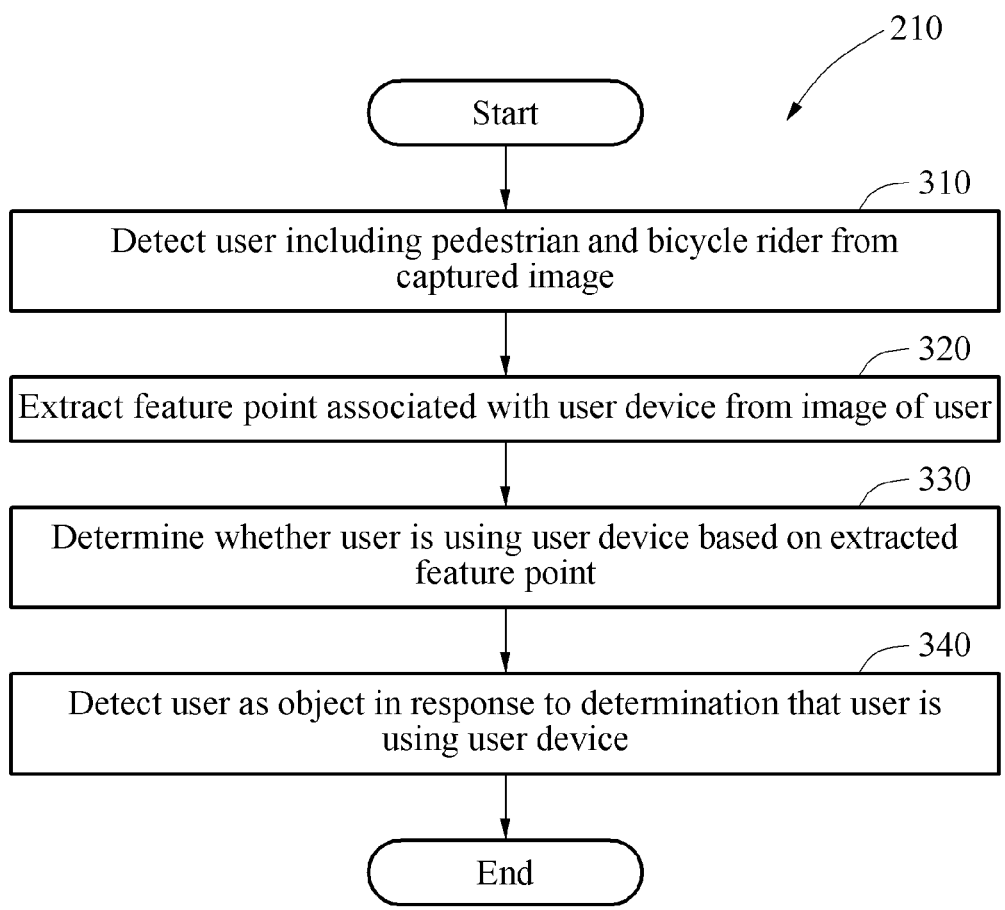
FIG. 3 illustrates an example of a method of detecting an object.

FIG. 3 illustrates an example of a method of detecting an object. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the above descriptions of FIGS. 1-2 are also applicable to FIG. 3, and are incorporated herein by reference. Thus, the above description may not be repeated here.

In 310, an informing apparatus detects a user including a pedestrian and a bicycle rider from a captured image. The informing apparatus detects the user by extracting feature points. The informing apparatus detects the user by extracting feature points corresponding to a shape of a leg motion of the pedestrian or a unique shape of the bicycle rider including a shape of a bicycle using, for example, an SIFT scheme, a HOG scheme, and a neural network.

In 320, the informing apparatus extracts a feature point associated with a user device from an image of the user. The informing apparatus extracts a static feature point including an exterior feature of the user. The static feature point includes, for example, predetermined points indicating an angle of a head or a neck pointing down when the user is looking downward, an angle of a hand pointing up when the user is using the hands for an activity not related to walking, and predetermined points on an ear of the user wearing an earphone or a headphone. The informing apparatus extracts the static feature point using a first classifier trained in advance.

In an example, the informing apparatus extracts dynamic feature points including features of consecutive motions of the user and a feature of a distinctive movement in an ambient environment around the user. The informing apparatus extracts the dynamic feature points using at least one of an optical flow-based object tracking method or a second classifier trained in advance. The consecutive motions of the user include the feature of the distinctive movement in the ambient environment around the user and the features of the consecutive motions of the user, for example, the user shaking a body and dancing motions of the user. Also, the feature of the distinctive movement in the ambient environment around the user includes various movements used to distinguish the user from people around the user, for example, the user walking at a different speed or with a different gesture when compared to the others.

In 330, the informing apparatus determines whether the user is using the user device based on the feature point extracted in 320. The informing apparatus determined whether the user is using the user device based on at least one of the static feature point and the dynamic feature points.

In 340, the informing apparatus detects the user as an object in response to a determination that the user is using the user device.

Figure 4:
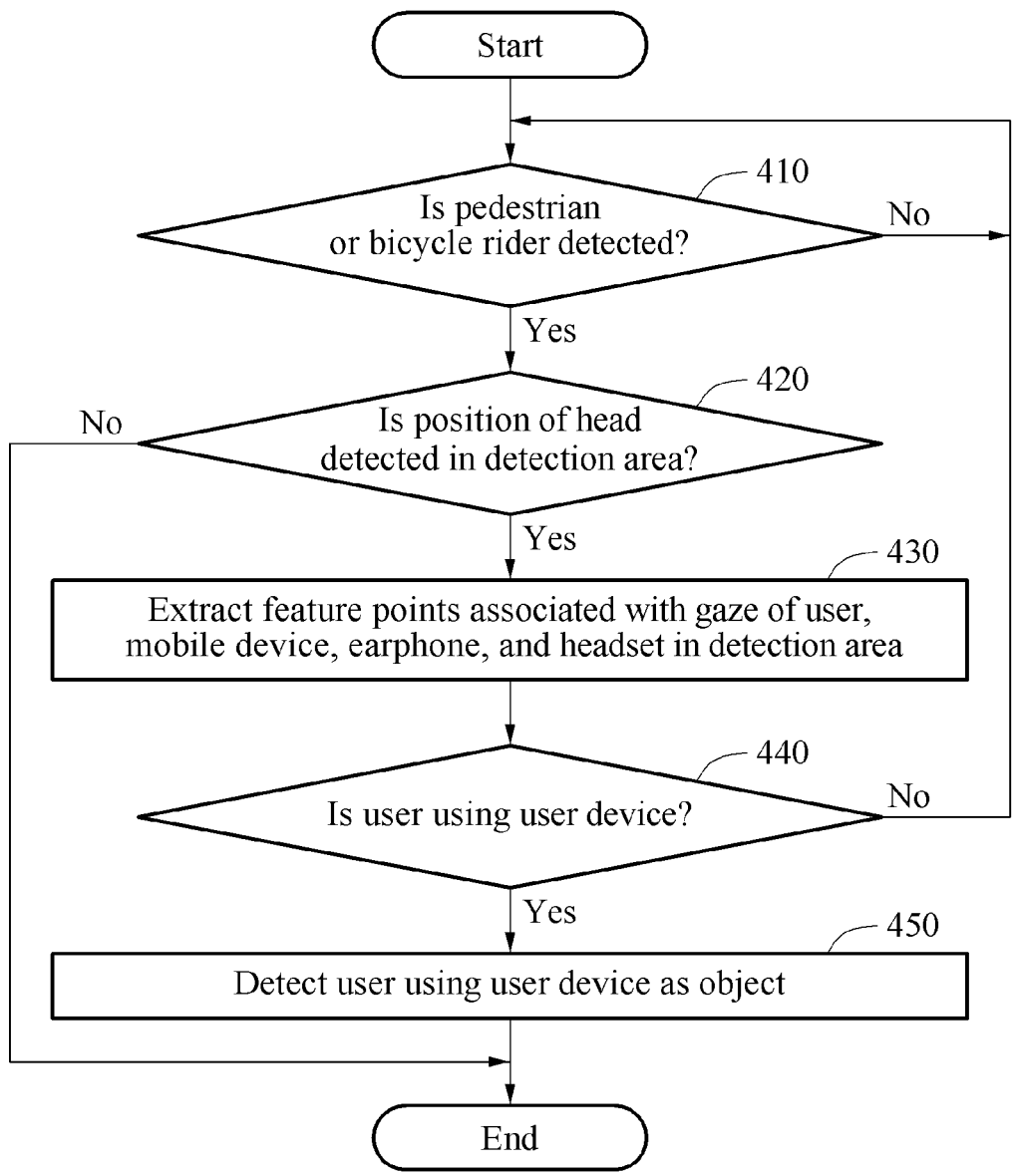
FIGS. 4 and 5 illustrate examples of a method of informing an object of an approach of a vehicle.

FIG. 4 illustrates a method of informing an object of an approach of a vehicle. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the above descriptions of FIGS. 1-3 are also applicable to FIG. 4, and are incorporated herein by reference. Thus, the above description may not be repeated here.

In 410, an informing apparatus determines whether a pedestrian or a bicycle rider is detected from a captured image. In an example, the informing apparatus determines whether the pedestrian or the bicycle rider is detected from the captured image using a HOG, a SIFT, and a neural network as described above. When it is determined that the pedestrian or the bicycle rider is not detected in operation 410, the informing apparatus terminates an operation.

In 420, when it is determined that the pedestrian or the bicycle rider is detected in 410, the informing apparatus determines whether a position of a body portion area, for example, a head of the pedestrian or the bicycle rider is detected from a detection area. When the position of the head is not detected in 420, the informing apparatus terminates an operation.

In 430, when it is determined that the position of the head of the pedestrian or the bicycle rider is detected in operation 420, the informing apparatus extracts feature points associated with a gaze of the user, a mobile device, an earphone, or a headset in the detection area. The informing apparatus extracts at least one of a feature point associated with the user device or the feature point associated with the body portion area of the user using, for example, a SIFT scheme, a HOG scheme, and a neural network in operation 430. In this example, the feature point associated with the user device and the feature point associated with the body portion area of the user correspond to the static feature point. The body portion area includes, for example, the head, an ear, and a hand.

The feature point associated with the body portion area of the user corresponds to feature points such as, for example, a shape of a head or a headset worn on an ear, an earphone, a headphone, a gaze of the user on a mobile device, an angle of the head, and a shape of a hand manipulating the mobile device.

In 440, the informing apparatus determines whether the user is using the user device. In 440, when it is determined that the user is not using the user device, the informing apparatus terminates an operation.

In an example, the informing apparatus inputs the feature point extracted in 430 to a trained classifier and determines whether the user is using the user device. The classifier is trained to classify a shape or a form of the user using the user device based on, for example, a support vector machine (SVM), a random forest, and a neural network.

The SVM that belongs to a field of machine learning is a learning model for pattern recognition and data analysis and is used for classification and regression analysis. When a set of data belonging to one of two categories is given, an SVM algorithm may generate a non-stochastic binary linear classification model that determines, based on the set of data, the category to which the new data belongs. The generated classification model is represented as a boundary in a space in which the data is mapped. The SVM algorithm is used to obtain the boundary having a greatest width.

The random forest also belongs to the field of machine learning and corresponds to an ensemble learning method used for the classification and the regression analysis. The random forest operates by outputting an average value of predictions or classifications from a plurality of decision trees constructed during a training process. The average value of predictions is obtained through, for example, the regression analysis.

In 450, the informing apparatus detects that the user as an object when it is determined that the user is using the user device in 440.

Figure 5:
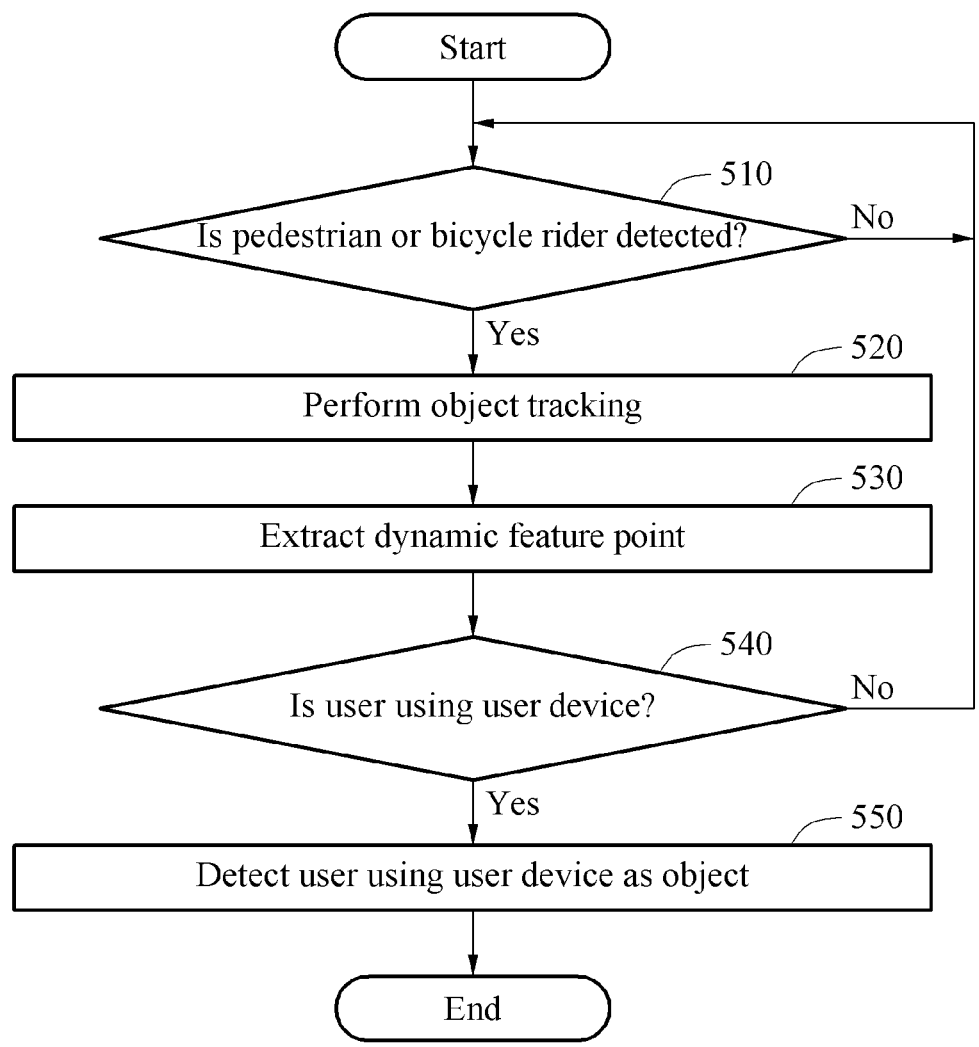

FIG. 5 illustrates an example of a method of informing an object of an approach of a vehicle. The operations in FIG. 5 may be performed in the sequence and manner as shown, although the order of some operations may be changed or some of the operations omitted without departing from the spirit and scope of the illustrative examples described. Many of the operations shown in FIG. 5 may be performed in parallel or concurrently. One or more blocks of FIG. 5, and combinations of the blocks, can be implemented by special purpose hardware-based computer that perform the specified functions, or combinations of special purpose hardware and computer instructions. In addition to the description of FIG. 5 below, the above descriptions of FIGS. 1-4 are also applicable to FIG. 5, and are incorporated herein by reference. Thus, the above description may not be repeated here.

Referring to FIG. 5, in 510, an informing apparatus determines whether a pedestrian or a bicycle rider is detected from a captured image. When it is determined that the pedestrian or the bicycle rider is not detected in operation 510, the informing apparatus terminates the operation.

When it is determined that the pedestrian or the bicycle rider is detected in operation 510, in 520, the informing apparatus performs an object tracking on the detected pedestrian or bicycle rider. In 530, the informing apparatus extracts a dynamic feature point. In an example, the object tracking is based on an optical flow. The informing apparatus performs the object tracking using an energy function defined using an optical flow reflecting a movement of each object in an image, thereby extracting the dynamic feature point of the pedestrian or the bicycle rider. A feature of the optical flow may be used as effective information for dividing an area of an object in the image. The informing apparatus extracts dynamic feature points using a depth map based on the optical flow. The object tracking is performed based on algorithm, such as, for example, K shortest path (KSP) algorithm. In the KSP algorithm, corresponding points may be found in consideration of a depth and a dimension in a feature space of numerous images such as a multi-view. The corresponding points are, for example, points corresponding to the same object or target.

The dynamic feature point is associated with consecutive motions such as, for example, a dancing motion and an activity trajectory of the pedestrian or the bicycle rider.

In 540, the informing apparatus determines whether the user is using the user device based on the dynamic feature point extracted in 530. In operation 540, when it is determined that the user is not using the user device, the informing apparatus terminates an operation.

The informing apparatus inputs the dynamic feature point extracted in operation 530 to a trained classifier and determines whether the user is using the user device. The classifier is based on, for example, an SVM, a random forest, and a neural network.

In 550, the informing apparatus detects the user using the user device as an object when it is determined that the user is using the user device in operation 540.

Figure 6:
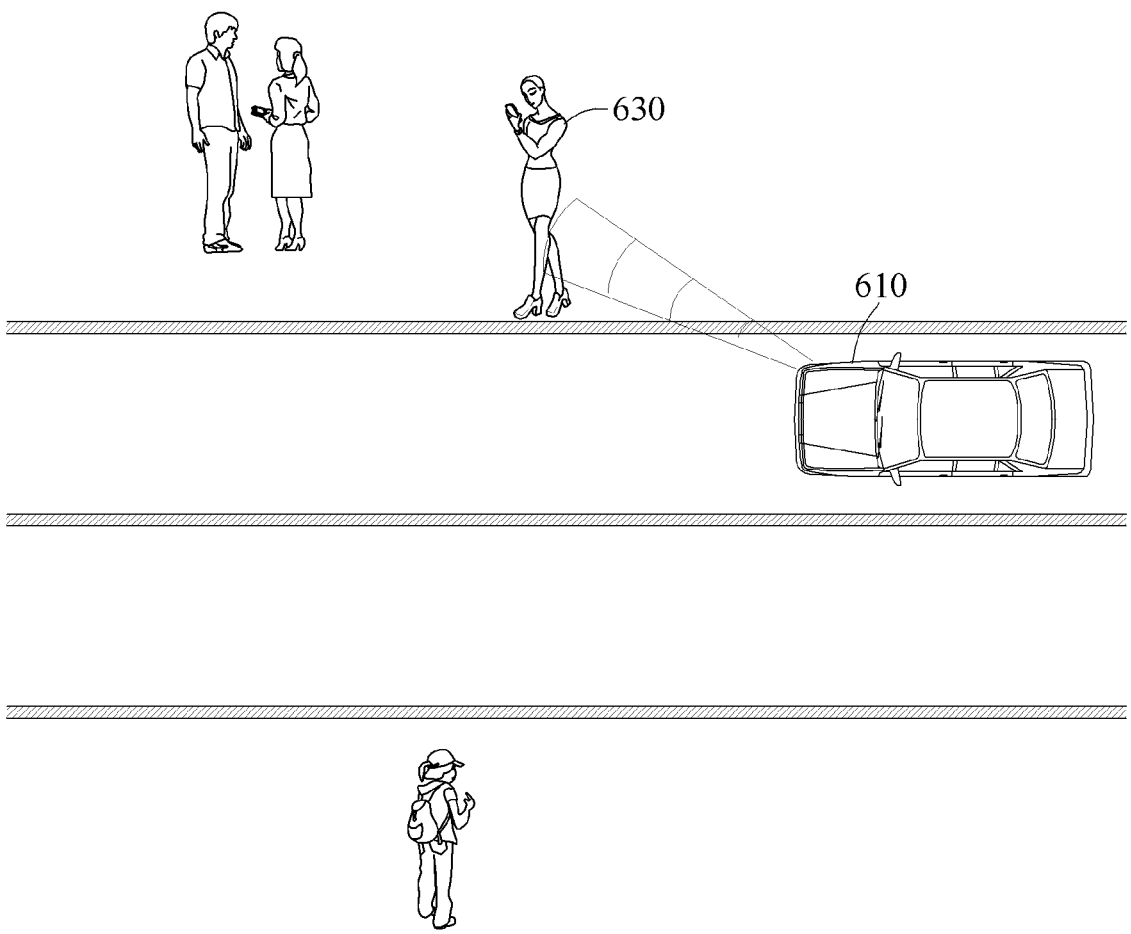
FIG. 6 illustrates an example of a method of informing an object of an approach of a vehicle.

FIG. 6 illustrates an example of a method of informing an object of an approach of a vehicle. FIG. 6 illustrates a vehicle 610 including an informing apparatus and a detected object 630.

In an example, the informing apparatus included in the vehicle 610 informs the object 630 that the vehicle 610 is approaching through an auditory output that delivers a sound to an external area of the vehicle 610. The informing apparatus informs the object 630 that the vehicle 610 is approaching by providing auditory information, such as, for example, "Vehicle is approaching. Attention! Attention!" through an audio system, such as, for example, a directional speaker.

In an example, the informing apparatus informs the object 630 that the vehicle 610 is approaching by providing visual information using a headlight of the vehicle 610. For example, the informing apparatus flickers the headlight at short intervals or turns the headlight on for a period of time to inform the object 630 that the vehicle is approaching. In an example, the informing apparatus informs the user device of the object 630 that the vehicle 610 is approaching through a wireless communication between the user device and the vehicle 610.

When it is determined that the object 630 is using the user device, the informing apparatus informs an occupant of the vehicle 610 that the object 630 is approaching. The informing apparatus informs the occupants of the vehicle 610 that the object 630 is approaching using any one or any combination of methods and devices such as, for example, auditory information using the audio system included in the vehicle 610, visual information on a display in the vehicle 610, tactile information delivered through a steering handle of the vehicle 610, and a vibration of a vehicle's seat, and delivers information of the approaching object to a driving system that controls or guides the driving of the vehicle. Other devices for informing the occupants of the vehicle 610 that the object 630 is approaching may be used without departing from the spirit and scope of the illustrative examples described.

When it is determined that the object 630 is using the user device, the informing apparatus provides a warning message indicating "Object is approaching. Attention! Attention!" through the audio system included in the vehicle 610 or provides a vibrating stimulation through the steering handle or the seat in the vehicle 610, thereby informing the occupant of the vehicle 610 that the object 630 is approaching.

In an example, the informing apparatus informs the occupants of the vehicle that the object 630 is not paying attention to its surroundings on a display such as a head-up display (HUD) and a vehicular infotainment system. In an example, the informing apparatus informs the occupants of the vehicle of an approach of the object 630 by displaying the object or a warning message on a screen in the vehicle based on an augmented reality.

Figure 7:
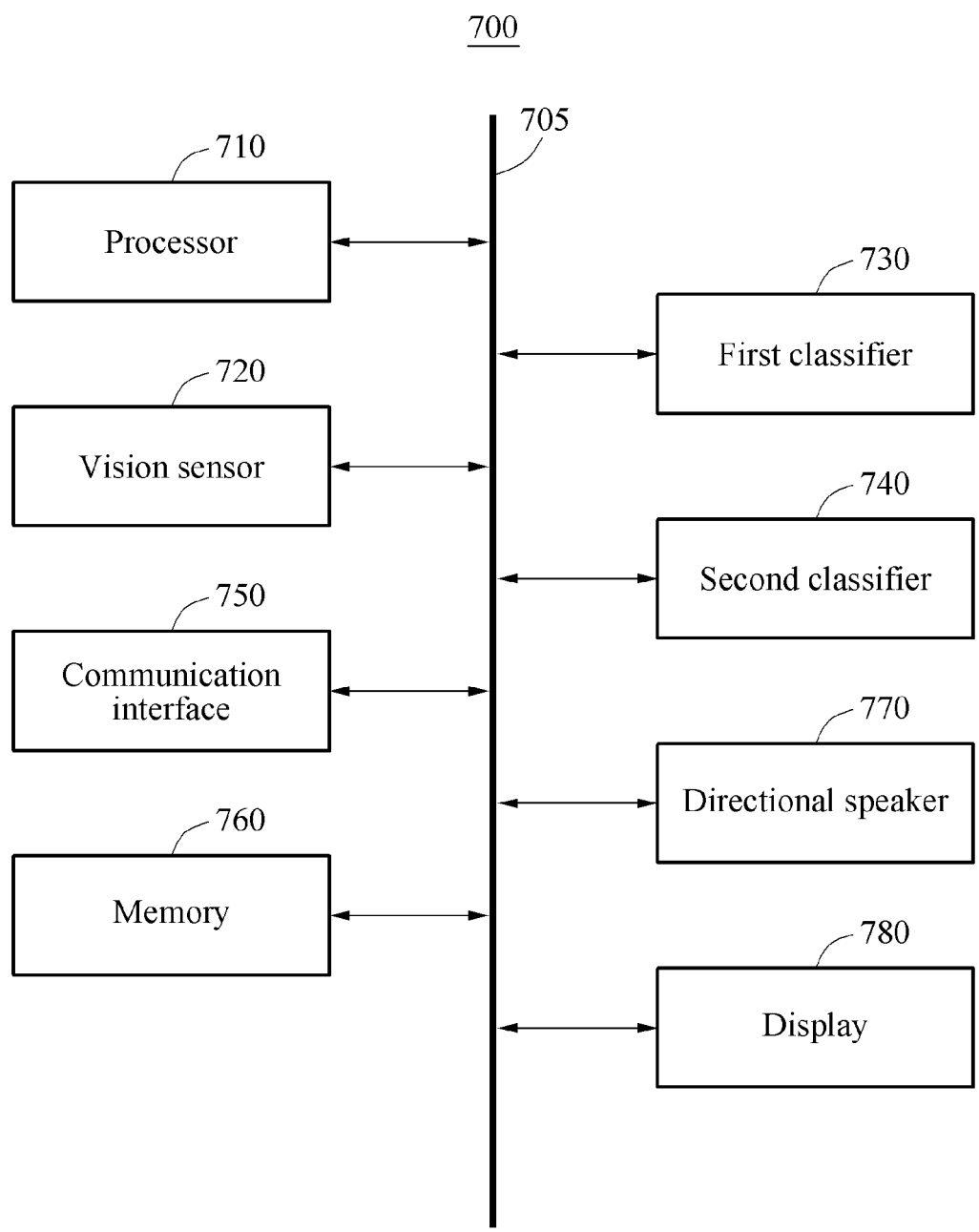
FIG. 7 illustrates an example of an apparatus for informing occupant of a vehicle that an object is approaching.

FIG. 7 illustrates an example of an apparatus for informing occupants of the vehicle that an object is approaching. Referring to FIG. 7, an apparatus 700 for providing information on an approach of an object includes a processor 710, a vision sensor 720, a first classifier 730, a second classifier 740, a communication interface 750, a memory 760, a directional speaker 770, and a display 780. The vision sensor 720 may be replaceable with various types of image capturing devices such as, for example, a CIS camera and an infrared camera.

The processor 710, the vision sensor 720, the first classifier 730, the second classifier 740, the communication interface 750, the memory 760, the directional speaker 770, and the display 780 are connected with one another through a communication bus 705.

The processor 710 detects an object that is using a user device from a captured image. When the object is detected, the processor 710 informs an occupants of the vehicle that the object is approaching.

The processor 710 detects a user including a pedestrian and a bicycle rider from the captured image. The processor 710 determines whether the user is using the user device based on a feature point associated with the user device extracted from an image of the user. When it is determined that the user is using the user device, the processor 710 detects the user using the user device as the object.

The processor 710 extracts a static feature point including an exterior feature of the user using the first classifier 730 that is trained in advance. The static feature point includes feature points such as, for example, points indicating an angle of a head or a neck pointing down when the user is looking downward and points of an ear of the user wearing an earphone or a headphone.

The processor 710 extracts dynamic feature points including features of consecutive motions of the user and a feature of a distinctive movement in an ambient environment around the user using at least one of an optical flow-based object tracking method and the second classifier 740 trained in advance.

The consecutive motions of the user include motions, for example, motions of the user shaking a body and dancing motions of the user. Also, the feature of the distinctive movement in the ambient environment around the user includes various movements used to distinguish the user from people around the user, for example, the user walking at a different speed or with a different gesture when compared to others.

In an example, the first classifier 730 and the second classifier 740 are based on an SVM, a random forest, and a neural network.

In an example, the processor 710 extracts the static feature point and the dynamic feature points simultaneously or separately.

In an example, the processor 710 detects a position of a body part of the user from an image of the user captured by the vision sensor 720, and extracts at least one of a feature point associated with the user device or a feature point associated with the body part of the user from the image of the user.

The processor 710 informs the occupants of the vehicle that the object is approaching based on at least one of visual information displayed on the display 780, auditory information using an audio system included in the vehicle, tactile information delivered through a steering handle of the vehicle, or a vibration of a seat of the vehicle.

When it is determined that the object is using the user device, the processor 710 informs the object that the vehicle is approaching.

The directional speaker 770 is a speaker facing a direction of the object and provides a desired sound only in the direction of the object. The processor 710 informs the object that the vehicle is approaching by providing auditory information through the directional speaker 770.

The communication interface 750 performs wireless communication between the user device and the vehicle. In this example, the vehicle may include the apparatus 700 or the apparatus 700 may be mounted on the vehicle. The processor 710 informs the user device of the object that the vehicle is approaching through the communication interface 750.

The processor 710 performs at least one of the methods described with reference to FIGS. 1 through 6. The processor 710 is configured to execute a program and control the apparatus 700. A program code executed by the processor 710 is stored in the memory 760.

The memory 760 operates as a storage. The memory 760 stores various pieces of information generated by the processor 710 and information received through the communication interface 750.

The memory 760 stores various types of data and programs. The memory 760 is described in details below.

In an example, the apparatus 700 for providing information on an approach of an object informs the occupants of the vehicle that the object is approaching using visual information that is displayed on a display 780 in the vehicle. In an example, the informing apparatus informs the occupants of the vehicle that the object is not paying attention to its surroundings on a display 780. In an example, the display 780 may be a physical structure that includes one or more hardware components that provide the ability to render a user interface and/or receive user input. The display 780 can encompass any combination of display region, gesture capture region, a touch sensitive display, and/or a configurable area. In an example, the display can be embedded in the apparatus 700 for providing information on an approach of an object. In an example, the display 780 is an external peripheral device that may be attached to and detached from the apparatus 700 for providing information on an approach of an object. The display 780 may be a single-screen or a multi-screen display. A single physical screen can include multiple displays that are managed as separate logical displays permitting different content to be displayed on separate displays although part of the same physical screen. The display 780 may also be implemented as an eye glass display (EGD), which includes one-eyed glass or two-eyed glasses.

In an example, the display 780 is a head-up display (HUD), a vehicular infotainment system, or a screen in the vehicle that used augmented reality.

The apparatus 700 may be an autonomous driving vehicle or a vehicle including an ADAS. Also, the apparatus 700 may be an apparatus embedded in the autonomous driving vehicle or the vehicle including the Advanced Driver Assistance Systems (ADAS).

The Informing apparatus, apparatus 700 for providing information on an approach of an object, first classifier 730, second classifier 740, communication interface 750, and other apparatuses, units, modules, devices, and other components described herein with respect to FIGS. 2-5 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-5 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A non-transitory computer-readable medium storing instructions that, when executed by a processor, causes the processor to perform a method comprising:
    detecting a user from an image;
    extracting a feature point associated with a device from the image of the user;
    detecting, from the image, that the user is using the device based on the feature point; and
    informing the user that a vehicle is approaching,
    wherein the extracting of the feature point comprises any one or any combination of:
    extracting a static feature point comprising an exterior feature of the user; and
extracting dynamic feature points comprising any one or any combination of features of consecutive motions of the user and a feature of a distinctive movement in an ambient environment around the user.

2. The non-transitory computer-readable medium of claim 1, wherein the extracting of the static feature point comprises:
    extracting the static feature point comprising the exterior feature of the user using a first classifier trained in advance.

3. The non-transitory computer-readable medium of claim 1, wherein the extracting of the dynamic feature points comprises:
    extracting the dynamic feature points using at least one of an optical flow-based object tracking method or a second classifier trained in advance.

4. The non-transitory computer-readable medium of claim 1, wherein the determining of whether the user is using the device comprises:
    determining whether the user is using the device based on at least one of the static feature point or the dynamic feature points.

5. The non-transitory computer-readable medium of claim 1, wherein the method further comprises:
    detecting a position of a portion of a body of the user.

6. The non-transitory computer-readable medium of claim 5, wherein the detecting of the user comprises:
    detecting the user from the image; and
    extracting at least one of the feature point associated with the device or a feature point associated with the portion of the body of the user from the image of the user.

7. The non-transitory computer-readable medium of claim 5, wherein the portion of the body of the user comprises at least one of a head, an ear, or a hand of the user.

8. The non-transitory computer-readable medium of claim 1, wherein the informing of the user that the vehicle is approaching comprises any one or any combination of:
    informing the user that the vehicle is approaching by providing auditory information using a directional speaker;
    informing the user that the vehicle is approaching by providing visual information using a headlight of the vehicle; and
    informing the device of the user that the vehicle is approaching through wireless communication between the device and the vehicle.

9. The non-transitory computer-readable medium of claim 1, wherein the method further comprises:
    informing an occupant of the vehicle that the user is approaching, in response to a determination that the user is using the device.

10. The non-transitory computer-readable medium of claim 9, wherein the informing of the occupant of the vehicle that the user is approaching comprises:
    informing the occupant in the vehicle that the user is approaching based on any one or any combination of auditory information using an audio apparatus in the vehicle, visual information on a display in the vehicle, tactile information delivered by a steering of the vehicle, and a vibration of a seat.

11. The non-transitory computer-readable medium of claim 1, wherein the detecting of the user comprises:
    detecting the user t user currently using the device from the image using a classifier trained based on images of users using the device.

12. The non-transitory computer-readable medium of claim 1, wherein the device comprises at least one of a headset, an earphone, cell phone, smart phone, mobile device, music player, or a portable terminal.

13. The non-transitory computer-readable medium of claim 1, wherein the user comprises any one of a pedestrian, a wheelchair rider, or a bicycle rider.

14. The non-transitory computer-readable medium of claim 1, wherein the static feature point comprises any one or any combination of points indicating an angle of a head or a neck pointing downward, a gaze of the user pointing downwards, an angle of a hand pointing upward, a shape of a hand manipulating the device, and points on an ear of the user wearing a headphone.

15. The non-transitory computer-readable medium of claim 1, wherein the dynamic feature points comprises any one or any combination of the user shaking a body, dancing motions of the user, the user walking at a different pace when compared to other in the ambient environment, and the user moving with a different gesture when compared to the other users in the ambient environment.

16. The non-transitory computer-readable medium of claim 1, wherein the static feature point and the dynamic feature points are extracted simultaneously.

17. The non-transitory computer-readable medium of claim 1, wherein the static feature point and the dynamic feature points are extracted separately.

18. An apparatus for an advanced driver assistance system (ADAS) informing an occupant of a vehicle of an approaching object, the apparatus comprising:
    a processor configured to detect that a user of the approaching object is using a device from an image, to determine whether the user is using the device based on a feature point associated with the device extracted from the image of the user, and inform the occupant that the user is approaching, in response to determining that the user is using the device,
    wherein the processor is further configured to extract the feature point by any one or any combination of:
    extracting a static feature point comprising an exterior feature of the user; and extracting dynamic feature points comprising any one or any combination of features of consecutive motions of the user and a feature of a distinctive movement in an ambient environment around the user.

19. The apparatus of claim 18,
wherein the extracting the static feature point comprises extracting the static feature point comprising the exterior feature of the user using a first classifier trained in advance; and
wherein the extracting the dynamic feature points comprises extracting the dynamic feature points comprising any one or any combination of features of consecutive motions of the user and the feature of the distinctive movement in the ambient environment around the user using at least one of an optical flow-based object tracking method or a second classifier trained in advance.

20. The apparatus of claim 18, further comprising:
a vision sensor configured to capture the image.

21. The apparatus of claim 18, wherein the processor is further configured to detect the user from the image, to detect a position of a body portion of the user, and to extract at least one of the feature point associated with the device or a feature point associated with the body portion of the user from the image.

22. The apparatus of claim 18, wherein the processor is further configured to inform the occupant in the vehicle that the user is approaching based on any one or any combination of auditory information using an audio apparatus in the vehicle, visual information on a display in the vehicle, tactile information delivered by a steering of the vehicle, or a vibration of a seat.

23. The apparatus of claim 18, wherein the processor is further configured to inform the user that the vehicle is approaching, in response to the determining that the user is using the device.

24. The apparatus of claim 23, further comprising:
a directional speaker configured to face a direction of the user,
wherein the processor is further configured to inform the user that the vehicle is approaching by providing auditory information using the directional speaker.

25. The apparatus of claim 18, further comprising:
a communication interface configured to perform wireless communication between the vehicle and the device,
wherein the processor is further configured to inform the device used by the user that the vehicle is approaching through the wireless communication.

26. An apparatus for detecting an object approaching a vehicle, the apparatus comprising:
a sensor configured to capture an image;
a processor configured to detect a user from the image, to extract a feature point associated with a device of the user or a feature point associated with a portion of a body of the user from the image of the user, to detect the object using the device based on the feature point, and to issue an alert of the object approaching the vehicle; and
a communicator configured to output the alert,
wherein the extracting of the feature point associated with the device or the feature point associated with the portion of the body of the user comprises any one or any combination of:
extracting a static feature point comprising an exterior feature of the user; and
extracting dynamic feature points comprising any one or any combination of features of consecutive motions of the user and a feature of a distinctive movement in an ambient environment around the user.

* * * * *